United States Patent [19]

Nishino

[11] Patent Number: 4,636,000
[45] Date of Patent: Jan. 13, 1987

[54] SIDE SUPPORT DEVICE IN A VEHICLE SEAT
[75] Inventor: Takaishi Nishino, Akishima, Japan
[73] Assignee: Tachikawa Spring Co. Ltd., Tokyo, Japan
[21] Appl. No.: 778,260
[22] Filed: Sep. 20, 1985
[30] Foreign Application Priority Data Sep. 28, 1984 [JP] Japan ............................ 59-203377
Sep. 28, 1984 [JP] Japan ............................ 59-203378

[51] Int. Cl.$^4$ ............................................. A47C 7/14
[52] U.S. Cl. ....................................... 297/284; 297/458
[58] Field of Search .................................. 297/284, 458

[56] References Cited
U.S. PATENT DOCUMENTS 3,608,960 9/1970 Sherman .......................... 297/284
4,455,047 6/1984 Watanabe ......................... 297/284
4,500,136 2/1985 Murphy et al. .................... 297/284
4,536,030 8/1985 Sakurada et al. ................. 297/284
4,537,444 8/1985 Mariyama et al. ................. 297/284

Primary Examiner—William E. Lyddane
Assistant Examiner—Peter R. Brown
Attorney, Agent, or Firm—Cushman, Darby & Cushman

[57] ABSTRACT

A side support device for use in a seat back or a seat cushion of an automotive seat is disclosed. In the side support device, two sub-panels or support panels are provided respectively in the insides of the two side portions of a seat frame, the respective inner ends of the sub-panels or support panels are engaged with the associated portions of a pad receiving member extended between the two sides of the seat frame, and the respective outer ends thereof are connected via connecting links to an operation member, whereby by means of operation of the operation lever the side support device can be adjusted so as to support an occupant uniformly from his or her side portions through his or her central or back portions.

2 Claims, 6 Drawing Figures

SIDE SUPPORT DEVICE IN A VEHICLE SEAT

BACKGROUND OF THE INVENTION

1. Field of the Invention

The present invention relates to a side support device which supports the body of an occupant embracingly from both sides thereof in a seat, especially in a seat for a vehicle such as an automobile and the like.

2. Description of the Prior Art

A conventional vehicle seat such as an automotive seat of a type having two raised side portions is provided with a so-called side support device which is adapted to adjust the distance between the two raised side portions so as to vary the amount of support with respect to the side portions of the body of an occupant of the seat.

An example of the conventional seats equipped with this type of side support device is disclosed in Japanese Utility Model Publication No. 31,504 of 1979.

Specifically, as shown in FIG. 6, in the disclosed conventional seat, in the two side sections (1a)(1b) of a frame member (1) disposed in the back of the seat, there are mounted two raisedly formed support members (2) and (3) in such a manner that they can be rotated inwardly and outwardly, respectively. And, the two support members (2) and (3) can be rotated by an operation mechanism (not shown) comprising screw members and the like so as to adjust the distance between the two raised portions (a1)(a2) of the seat.

In such conventional seat side support device, however, since only the two raised side portions (a1)(a2) are changed with the rotation of the two support members (2) and (3), the side portions of the body of the occupant (b) can be indeed supported, but the intermediate portions (b1)(b2) disposed between the body side portions and the back portions of the occupant can be adjusted little in support so as to provide insufficient holding. Therefore, the above-mentioned conventional seat has a disadvantage that it cannot provide a comfortable sitting touch to the occupant.

SUMMARY OF THE INVENTION

The present invention aims at eliminating the drawbacks found in the above-mentioned prior art seat side support device.

Accordingly, it is a primary object of the invention to provide an improved seat side support device which is capable of adjusting the distance between the two raised portions of the seat as well as the distance between the portions disposed toward the central portion of the seat, that is, the foot portions of the two raised side portions to be able to support the body of an occupant uniformly so as to provide a comfortable sitting touch.

In attaining this object, according to one aspect of the invention, there are provided two sub-panels respectively disposed inwardly of and adjacently to two support frames which are mounted to the two side portions of a seat frame in such a manner that they can be rotatively adjusted inwardly and outwardly. The inner end of each of the sub-panels is caught on a portion of a pad-receiving S-shaped spring extending between the two side portions of a back frame, while the outer end thereof is connected via a link member to the middle portion of each of the support frames.

When the two support frames are rotated inwardly by an operation mechanism, the sub-panels, which are connected to the two support frames via the two link members, are rotated inwardly about their respective inner ends being engaged with associated pad receivers to move up pads so as to vary the amount of pushing-out of the foot portions of the two raised side portions. As a result of this, not only the body side portions of the occupant but also the intermediate portions between the bodiy side portions and the back portion of the occupant can be well supported so as to provide a comfortable sitting feeling.

It is another object of the invention to provide a side support device which allows the components thereof to flex following the pad receivers so as to be able to provide an improved support feeling.

To achieve this object, according to another aspect of the invention, there are provided two support panels which are respectively located in the respective front surfaces of the two side portions of a seat frame and also which are provided with projections in the respective inner edges thereof. The projections are respectively inserted through holders respectively mounted to the portions of two S-shaped springs which are extended across the seat frame side portions as the pad receivers, while the outer ends of the support panels are respectively connected with the free ends of link members which are respectively journalled so as to be rotatable inwardly and outwardly by an operation mechanism with an operation handle. The intermediate portions of the support panels are respectively connected via connecting links to the intermediate portions of the link members.

Accordingly, when the operation handle of the operation mechanism is actuated to rotate the link members inwardly, then the outer ends of the support panels are respectively moved rotatively about the respective insertion portions of the inner ends thereof relative to the associated holders and, at the same time, the intermediate portions of the two support panels are pushed inwardly by the connecting links to cause the projections in the inner ends thereof to be slided inwardly with respect to the holders respectively. As a result of this, the support panels are respectively moved inwardly as a whole, which narrows the distance between the two raised portions (a1),(a2) of the seat supported by the support panels and at the same time displaces the foot portions of the raised portions forwardly. Therefore, the occupant of the seat can be supported uniformly from his or her body side portions through back portion to enjoy a comfortable sitting feeling.

Also, since the support panels are respectively supported by S-shaped springs, when the occupant is just seated on the seat, the support panels are respectively flexed due to the load of the occupant following the S-shaped springs so as to provide a better support feeling to the occupant.

The above and other objects and features of the invention will appear more fully hereinafter from a consideration of the following description taken in connection with the accompanying drawings.

DETAILED DESCRIPTION OF PREFERRED EMBODIMENTS OF THE INVENTION

Figure 1:
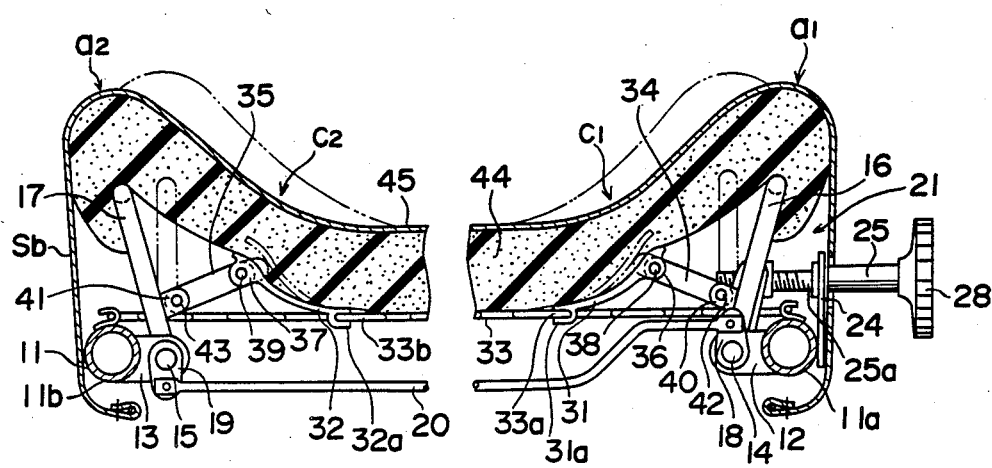
FIG. 1 is a partially cutaway transverse sectional view of a seat back of a vehicle seat incorporating a first embodiment of the invention.
Figure 2:
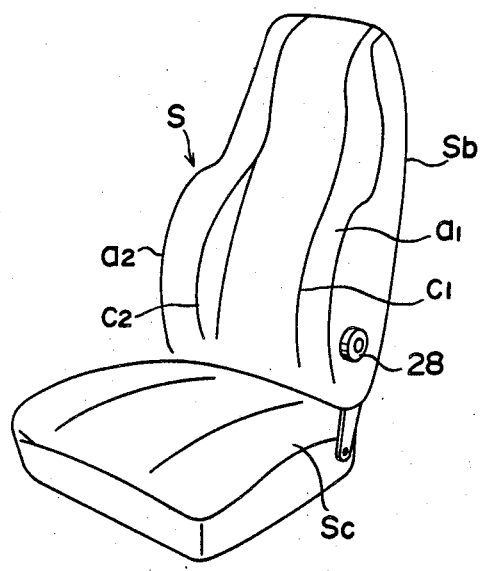
FIG. 2 is a perspective view of a seat containing therein a side support device of the invention.
Figure 3:
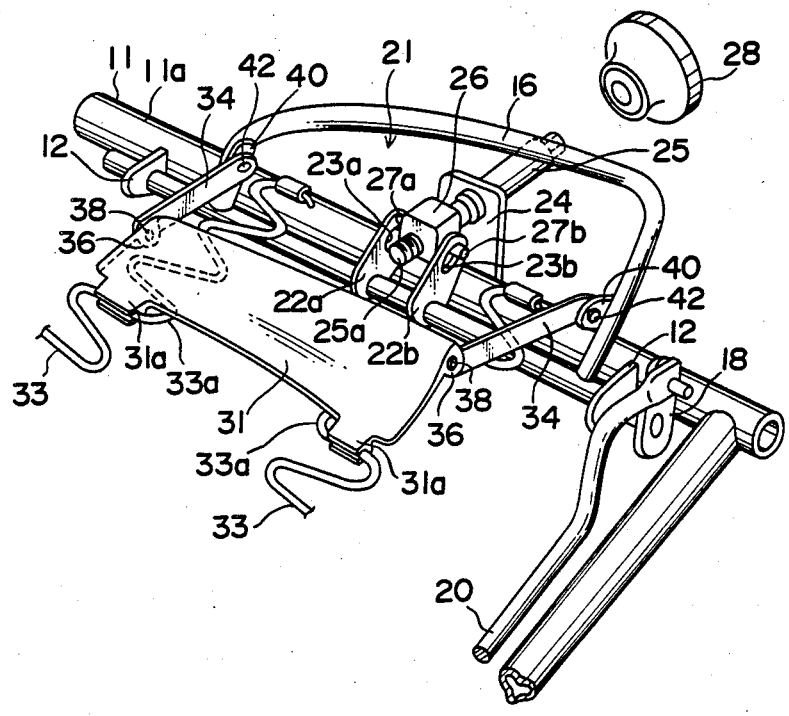
FIG. 3 is a perspective view of a half section of the above side support device of the invention.

Referring now to FIGS. 1-3, there is illustrated a first embodiment of the invention. In the drawings, reference character (S) designates a seat for a vehicle, and, in the illustrated example, a side support device of the invention is incorporated in the lower half section of a seat back Sb of the seat S. Specifically, the two raised side portions of the seat back (Sb), respectively designated by (a1)(a2), can be moved so as to vary the distance therebetween and in connection with such variation the amount of pushing-out of the foot portions (c1)(c2) of the two raised side portions (a1)(a2) can also be varied, so that the two sides of the back portion of an occupant can be supported according to the tastes of the occupant.

Numeral (11) designates a seat frame, that is, in the illustrated embodiment, a back frame disposed in the seat back (Sb), to the two side portions (11a) and (11b) of which back frame (11) are respectively fixed two pairs of brackets (12)(12) and (13)(13) vertically spaced a given interval from each other in such manner that the two pairs are opposed to each other. Between the two pairs of brackets (12)(12) and (13)(13) are journalled two shafts of rotation (14) and (15) in parallel with the two side portions (11a) (11b) of the back frame (11), respectively. To the two shafts of rotation (14) and (15) are fixed two support frames (16) and (17) having a substantially U-shaped configuration in such a manner that the two ends thereof are projected forwardly, respectively.

Also, to the respective lower ends of the two rotational shafts (14) and (15) are fixed link pieces (18) and (19) oriented in opposite directions to each other; that is, one link piece (18) is directed forwardly, the other link piece (19) is directed rearwardly. The respective free ends of the two link pieces (18) and (19) are connected with each othe2r by means of a connecting rod (20).

Further, in the one side portion (11a) of the back frame (11), there is provided an operation mechanism (21) disposed correspondingly to the central portion of the support frame (16).

Referring now to the operation mechanism (21) in detail, in the central portion of the one rotational shaft (14), there are fixed a pair of arms (22a)(22b) at the respective first ends thereof in such a manner that they are vertically spaced a required interval from each other, while in the respective free ends thereof there are formed enlongated bores (23a)(23b) extending in the longitudinal direction thereof and being opposed to each other. Also, correspondingly to these arms (22a)(22b), there is fixed a bracket (24) to the one side portion (11a) of the back frame (11). An operation shaft (25) is journalled by the bracket (24) in such a manner that it is prevented against movement in the axial direction thereof and it is free to rotate in the peripheral direction thereof. In the inner half section of the operation shaft (25), there is provided a threaded portion (25a) to which is threadedly mounted a nut block (26).

Two engagement pins (27a)(27b) respectively provided on and from the upper and lower surfaces of the nut block (26) are engaged with the above-mentioned elongated bores (23a)(23b) of the arms (22a)(22b), respectively. Also, an operation handle (28) is fitted to the outer end of the shaft of operation (25).

There are provided two sub-panels (31) and (32) positioned inwardly of the two support frames (16)(17), respectively, and they are respectively inclined in such a manner that the respective inner ends thereof are disposed higher and the respective outer ends thereof are disposed lower. Namely, each of the sub-panels (31), (32) has a recessed-arc-shaped cross section; the sub-panels (31), (32) are respectively provided in the inner edges thereof with U-shaped engagement hook portions (31a) and (32a) which are engaged with the portions (33a)(33b) of an S-shaped spring (33) from outside, the spring (33) being extended across the two side portions (11a)(11b) of the back frame (11) for receiving the pads, while the outer ends thereof are connected at the respective upper and lower portions thereof via two pairs of link mebers (34)(34) and (35)(35) to the support frames (16) and (17), respectively so that the sub-panels are inclined and retained in such a manner that the inner side thereof are disposed lower and the outer sides thereof are disposed higher.

The above-mentioned connection by means of the two pairs of link members (34)(34) and (35)(35) is achieved in the following manner: that is, the first ends of the respective link members are pivotally connected via connecting pins (38) (38) and (39)(39) to projections (36)(36) and (37)(37) provided respectively in the upper and lower edges of the outer ends of the subpanels (31) and (32), while the second ends thereof are pivotally connected via connecting pins (42)(42) and (43)(43) to projections (40)(40) and (41)(41) respectively fixed to the intermediate portions of the upper and lower side portions of the support frames (16) and (17).

There is provided a pad (44) in a normal way as to extend over from the two support frames (16),(17) through the sub-panels (31), (32) to the S-shaped spring (33), and the surface of the pad (44) is covered by a trim cover assembly (45). Although the S-shaped spring is used as the pad receiving member in the illustrated embodiment, other resilient members may also be used for this purpose.

Now, we will describe the operation of the present side support device constructed in the above-mentioned manner.

When the operation shaft (25) is rotated by the operation handle (28), then the nut block (26) threadedly engaged with the threaded portion (25a) of the operation shaft (25) is moved inwardly or outwardly and thus the arms (22a)(22b) engaged via the engagement pins (27a)(27b) with the nut block (26) are rotated together with the rotational shaft (14) so as to rotate one support frame (16) integrally therewith to rise up or fall down.

Also, in synchronization with the rotative rising or falling movement of this one support frame (16), the other support frame (17) connected via the connecting rod (20) to the one support frame (16) is caused to rise up or fall down in a symmetrical way as well. Such rotational rising or falling movements of the support frames (16),(17) vary the distance between the two raised side portions (a1),(a2) of the seat back (Sb).

Further, with the rotative rising or falling movements of the two support frames (16),(17), the two sub-panels (31) and (32) respectively connected to the two support frames (16), (17) through the two pairs of link members (34)(34) and (35) (35) are rotationally moved up or down about the respective engagement portions thereof with the S-shaped spring (33) because the respective inner edges thereof are engaged with the S-shaped spring (33) through the respective engagement hook portions (31a) and (32a) thereof, respectively, which varies the amounts of pushing-out of the portions of the pad (44) corresponding to the sub-panels (31) and (32) so as to displace the portions disposed centrally of the two raised side portions (a1),(a2) of the seat back (Sb), that is, the foot portions (c1),(c2) of the two raised side portions (a1),(a2), (see two-dot chained lines in FIG. 1).

Accordingly, since, in connection with the adjustment of the distance between the two raised side portions (a1)(a2) of the seat back (Sb), the amounts of push-out of the respective foot portions (c1)(c2) of the two raised side portions are varied, not only the side portions of the body of the occupant but also the intermediate portions (b1)(b2) between the body side portions and the back portion of the occupant can be well supported to provide a generally uniform support feeling and thus to be able to maintain a comfortable sitting condition.

Also, due to the fact that the respective inner ends of the sub-panels (31) and (32) are supported by the S-shaped spring (33), the sub-panels (31) and (32) are respectively flexed downwardly following the spring (33) due to the load produced when the occupant is just seated in the seat, eliminating the possibility of the occupant being given a strange feeling, so that a further comfortable support touch can be obtained.

Although in the above-mentioned embodiment the invention is applied to the seat back (Sb) of the seat, the invention is not limited to this but may be applied to a seat cushion (Sc) of the seat.

As described hereinbefore, according to the side support device for a seat constructed in accordance with the present invention, since not only the two raised side portions of the seat but also the portions disposed centrally of the two raised side portions can be movably adjusted, the occupant can be supported uniformly from the side portions of the seat to the central portions thereof to obtain a comfortable sitting touch. Also, because the sub-panels are respectively supported by the pad receiving member at the respective first ends thereof, the sub-panels are flexed following the pad receiving member when the occupant is just seated, so that a more comfortable support feeling can be obtained. These are typical examples of various practical effects provided by the present invention.

Figure 4:
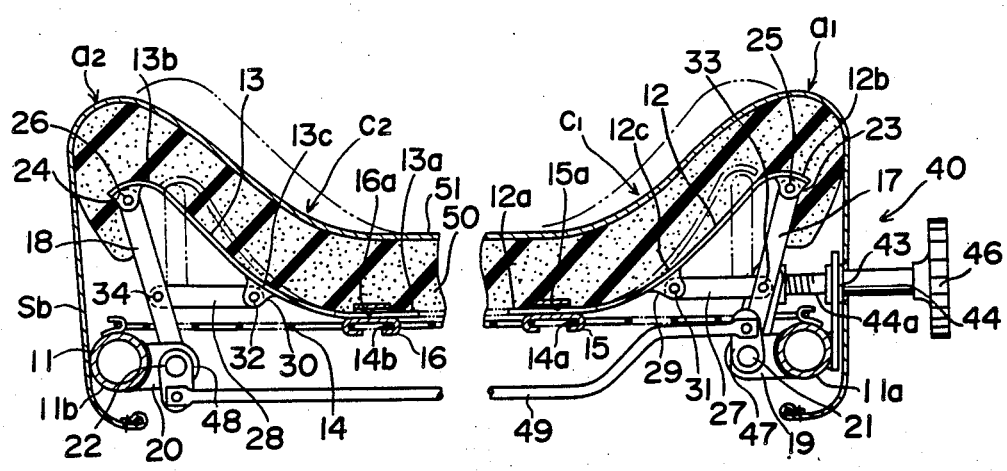
FIG. 4 is a partially cutaway transverse sectional view of a seat back of a vehicle seat incorporating a second embodiment of the invention.
Figure 5:
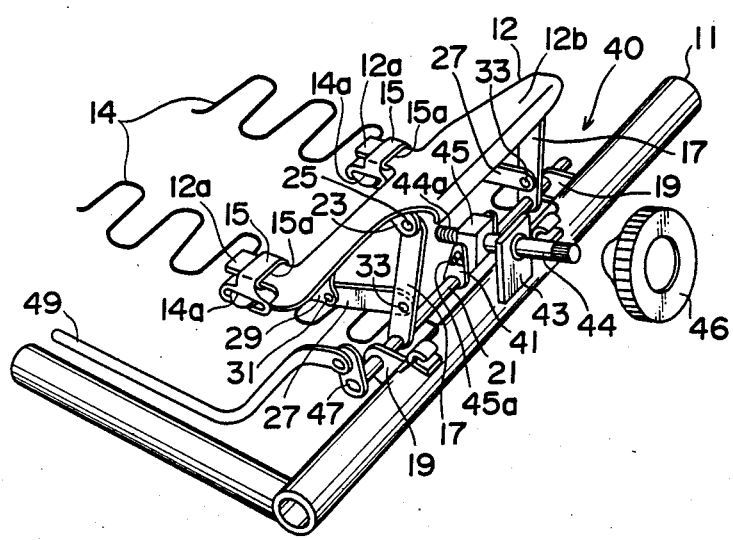
FIG. 5 is a perspective view of a half section of the second embodiment of the invention; and, FIG. 6 is an explanatory view of a conventional side support device.
Figure 6:
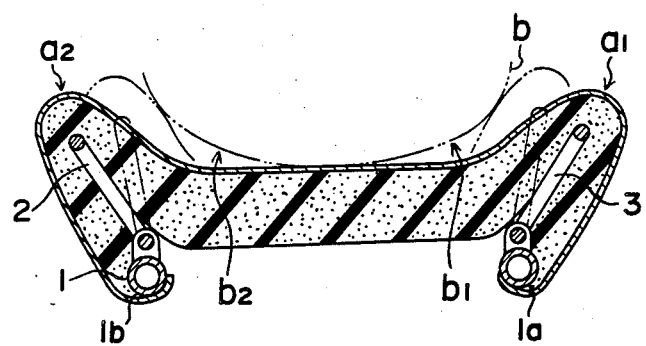

Referring now to FIGS. 4 and 5, there is illustrated a second embodiment of the invention. In the drawings, numeral (11) designates a seat frame, and, in the illustrated embodiment, a back frame located within a seat back (Sb). In the front surface side of the two side portions (11a) and (11b) of this back frame (11), there are provided support panels (12) and (13) respectively so inclined that the respective inner ends thereof are disposed lower and the respective outer ends thereof are disposed higher. In other words, each of the two support panels (12) and (13) is formed of a flexible resin material to have a concavely-curved configuration and the above-mentioned inclined arrangement of the two support panels (12) and (13) is accomplished in the following manner: the support panels (12) and (13) are provided in the respective inner edges thereof with paired projections (12a)(12a) and (13a)(13a); the projections (12a)(12a) and (13a)(13a) are respectively slidably inserted into and engaged with the associated insertion ports (15a)(15a) and (16a)(16a) of holders (15)(15) respectively fixed to the two outward portions (14a) and (14b) of a pad receiving S-shaped spring (14) which is extended between the two side portions (11a) and (11b) of the back frame (11); and, the outer ends (12b) and (13b) of the support panels (12) and (13) are respectively connected to link members (17)(17) and (18)(18) respectively journaled in an inwardly and outwardly rotatable manner to the side portions (11a) and (11b) of the back frame (11). The link members (17)(17) and (18)(18), which connect the support panels (12), (13) to the back frame (11), are fixed at the respective first ends thereof to rotary shafts (21) and (22) respectively journaled via upper and lower brackets (19)(19) and (20)(20) in parallel with the two side portions (11a) and (11b) of the back frame (11) in such a manner that the link members are spaced a given interval from each other in a vertical direction. The respective free ends of the link members are pivotally connected through connecting pins (25)(25) and (26)(26) to projection pieces (23)(23) and (24) (24) respectively formed in the upper and lower edges of the outer ends (12b) and (13b) of the support panels (12) and (13).

Also, the intermediate portions (12c) and (13c) of the support panels (12) and (13) are respectively connected to the intermediate portions of the link members (17)(17) and (18)(18) by means of connecting links (27)(27) and (28)(28). Specifically, the first ends of the connecting links (27)(27) and (28)(28) are pivotally connected via connecting pins (31) (31) and (32)(32) to projection pieces (29)(29) and (30)(30) provided in the upper and lower edges of the intermediate portions of the support panels (12)(13), respectively, while the second ends thereof are pivotally connected to the intermediate portions of the link members (17)(17) and (18)(18) via connecting pins (33)(33) and (34)(34), respectively.

A operation mechanism (40) for operating the thus-arranged support mechanism is provided in the one side portion (11a) of the back frame (11), that is, behind the support panel (12).

Referring now to the mechanism (40) in detail, a pair of arms (41)(41) are fixed at the respective first ends thereof to the central portion of the one rotary shaft (21) journaled to the back frame (11) in such a manner that the arms are spaced vertically a required interval from each other. Correspondingly to these arms (41)(41), a bracket (43) is fixed to the one side portion (11a) of the back frame (11). To this bracket (43) is journaled an operation shaft (44) in such a manner that it is prevented against movement in an axial direction and it is free to rotate in a peripheral direction. The operation shaft (44) is provided in the inner half section thereof with a threaded portion (44a) to which a nut block (45) is threadedly attached. Two engagement pins (45a)(45a) respectively provided in the upper and lower surfaces of the nut block (45) are engagedly connected to the free ends of the above-mentioned arms (41)(41) such that they can be moved longitudinally. Also, an operation handle (46) is fitted to the outer end of the operation shaft (44).

Also, to the respective lower ends of the two rotary shafts (21) and (22) are fixed link pieces (47)(48) which are opposed to each other, that is, one link piece (47) is faced forwardly and the other link piece (48) is faced rearwardly, while the respective free ends of the link pieces are connected with each other by means of a connecting rod (49), so that the link members (17)(17) and (18)(18) are cooperatively rotated in a symmetrical way.

In the above-mentioned structure, the support panels (12) and (13) may also be formed of rigid material such as a metal plate or the like. In this case, the projections (12a)(12a) and (13a)(13a) are respectively inseted into the insertion ports (15a)(15a) and (16a)(16a) of the holders (15)(15) and (16)(16) with clearance.

A pad (50) is placed as normally over the upper surfaces of the seat back ranging from the two support panels (12)(13) to the S-shaped spring (14). and the upper surface of the pad (50) is in turn covered by a trim cover assembly (51).

It should be noted here that the pad receiving member is not limited to the S-shaped spring but other resilient members may be used.

Next, we will describe the operation of the thus-formed embodiment of the invention.

First, when the operation handle (46) is operated to rotate the operation shaft (44) in the inward direction of the threaded portion (44a) thereof from its condition shown by solid lines in FIG. 4, then the nut block (45) being threadedly engaged with the threaded portion (44a) is moved inwardly to rotate the arms (41)(41) respectively engagedly connected with the nut block (45) through the engagement pins (45a)(45a) together with the one rotary shaft (21), so that the link members (17)(17) are rotated inwardly along with the shaft in an integral manner.

Also, in synchronization with the inward rotation of the link members (17)(17) due to the rotation of the one rotary shaft (21), the other rotary shaft (22) connected to the one rotary shaft (21) via the connecting rod (49) is rotated so as to rotate the other-side link members (18)(18) inwardly along with the rotary shaft (22) in an integral way.

With the rotational movements of both-side link members (17)(17) and (18)(18), namely, the inward rotation thereof, the outer ends (12b) and (13b) of the support panels (12) and (13) connected to the free ends of the link members are respectively moved inwardly in an rotational manner with the inner ends of the support panels being bent, so that the distance between the two raised side portions (a1)(a2) of the seat back (Sb) is narrowed. Here, in case when the support panels (12) and (13) are formed of rigid material, the projections (12a)(12a) and (13a)(13a) of the inner ends thereof are inserted into the insertion ports (15a)(15a) and (16a)(16a) of the holders (15) and (16) with clearance respectively, so that the outer ends of the support panels can be rotated due to the oscillation of the projections within the clearance.

Also, due to the inward rotation of the link members (17)(17) and (18)(18), the intermediate portions (12c) and (13c) of the support panels (12) and (13) connected via the connecting links (27) and (28) to the respective intermediate portions of the link members are respectively pushed inwardly and linearly to slide the projections (12a)(12a) and (13a) (13a) of the support panels (12) and (13) along the insertion ports (15a)(15a) and (16a)(16a) of the holders (15)(15) and (16)(16) respectively so as to move the whole support panels inwardly. And, the pad (50) is pushed out forwardly due to the rotational movement and linear movement of the support panels (12) and (13) to push out the portions displaced centrally from the two raised side portions (a1)-(a2) of the seat back (Sb), that is, the foot portions (c1)(c2) thereof. As a result of this, the distance between the two raised side portions can be altered while they are maintained in a wholly smooth curved condition, (see two-dot chained lines in FIG. 4).

When the operation handle (46) is rotated in the opposite direction from this condition, then the respective components are operated in the reversed way and the link members (17)(17) and (18)(18) are rotated outwardly, so that the two raised side portions of the seat back are returned to their original conditions, that is, the status shown by the solid lines in FIG. 4.

Accordingly, since in linking with the adjustments of the distance between the two raised side portions (a1)-(a2) of the seat back (Sb) the amounts of the push-out of the foot portions (c1)(c2) of the two raised side portions (a1)(a2) can be adjusted, not only the side portions of the occupant but also the intermediate portions (b1)(b2) between the side portions and the back portion of the occupant can be supported properly to provide a generally uniform support feeling to the occupant, so that the occupant is able to maintain his or her comfortable sitting condition.

Also, due to the fact that the inner ends, namely, the projections (12a)(12a) and (13a)(13a) of the support panels (12) and (13) are supported by the S-shaped spring (14), the support panels (12) and (13) can be flexed following the S-shaped shring (14) due to the load applied when the occupant is just seated on the seat, so that a more better support feeling can be obtained.

Although in the illustrated second embodiment of the invention a threaded mechanism including a threaded shaft and a nut block is employed as the operation mechanism (40), the invention is not limited to this, but other operation mechanisms such as a gear mechanism using a worm gear and the like may be employed.

Although the illustrated second embodiment of the invention is applied to the seat back (Sb) of the seat (S), of course, it may well be applied to the seat cushion of the seat as well. In this case, the same construction as with the above-mentioned embodiment can be employed and thus the application of the invention to the seat cushion is not described and illustrated here.

As described hereinbefore, according to the seat side support device of the invention, since the distance between the two raised side portions of the seat can be altered and the amounts of push-out of the foot portions of the raised side portions can be varied following the distance alteration of the raised side portions, the occupant can be supported uniformly from the side portions of the seat through the central portions thereof to obtain a comfortable sitting touch.

Also, due to the fact that the first ends of the support panels are supported by a pad receiving member, the support panels are respectively flexed following the pad receiving member at the time of the occupant's sitting, so that a more better support feeling can be obtained. Thus, the invention provides great practical effects.

What is claimed is:

1. A side support device for use in a seat having a pair of raised side portions on the right and left sides thereof, comprising:

a seat frame having a pair of lateral bar sections and a pair of support frames respectively journaled to said pair of lateral bar sections, said pair of support frames being each disposed within the respective pair of raised side portions, thereby allowing said pair of support frames to be rotated inwardly and outwardly of said seat;

means for adjustably rotating said pair of support frames so as to adjust the distance between said pair of raised side portions of said seat to thereby support an occupant's body from both sides thereof;

a pad receiving member extended between sides of said seat frame; and a pair of sub-panels respectively disposed inwardly of said pair of support frames, the arrangement of said pair of sub-panels being such that one end portion of each of said sub-panels are engaged with the pad receiving member while another end portion of each of said pair of sub-panels are connected to said pair of support frames;

whereby, when said rotating means is activated to cause said pair of support frames to rotate in a direction inwardly of said seat, said sub-panels are moved in the same inward direction simultaneously, thereby supporting both sides as well as the occupant's central body portion uniformly.

2. A side support device for use in a seat having a pair of raised side portions on the right and left sides thereof, comprising:

a seat frame having a front side and a pair of lateral bar sections;

a pair of support panels having intermediate portions and two end portions, said pair of support panels being arranged at the front side of said seat frame such that each of said pair of support panels is disposed within the respective pair of raised side portions of said seat;

two pairs of link members having intermediate portions and being respectively journaled to said pair of lateral bar sections of said seat frame in such a manner that the pairs of lateral bar sections are free to rotate inwardly and outwardly;

means for adjustably rotating said two pairs of link members; and link means for connecting the intermediate portions of said two pairs of link members, so as to adjust the distance between said pair of raised side portions of said seat to thereby support an occupant's body from both sides thereof;

a pad receiving member extended between said pair of lateral bar sections of said seat frame; and a holder member fixedly secured to the pad receiving member, one of said two end portions of said pair of support panels being slidably supported by the holder member in such a manner that each of said pair of support panels is free to slide through said holder member inwardly and outwardly, the other of said two end portions of said pair of support panels being journaled to said two pairs of link members;

whereby, when said rotating means is activated to cause said two pairs of link members to rotate, said one of two end portions of said pair of support panels is rotated inwardly and outwardly and, at the same time, said other of the two end portions of said pair of support panels is slided inwardly and outwardly through said holder member, thereby supporting an occupant along both sides of the occupant's body.

* * * * *